Figure 3:
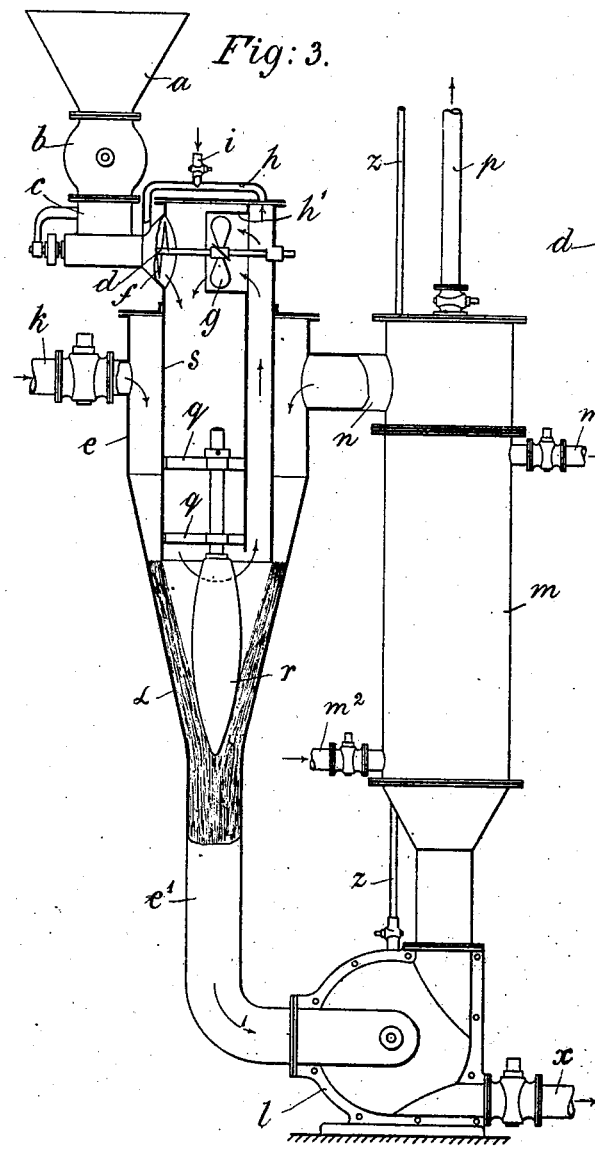

No. 668,778. Patented Feb. 26, 1901.
C. STEFFEN.
PROCESS OF PRECIPITATING SUGAR.
(Application filed Apr. 6, 1898.)
(No Model.) 4 Sheets—Sheet 1.
Fig: 2.
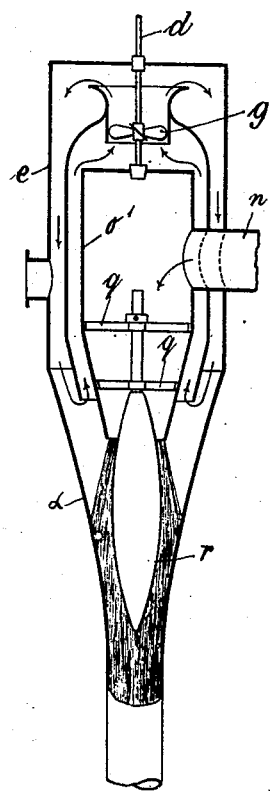
Fig: 1.
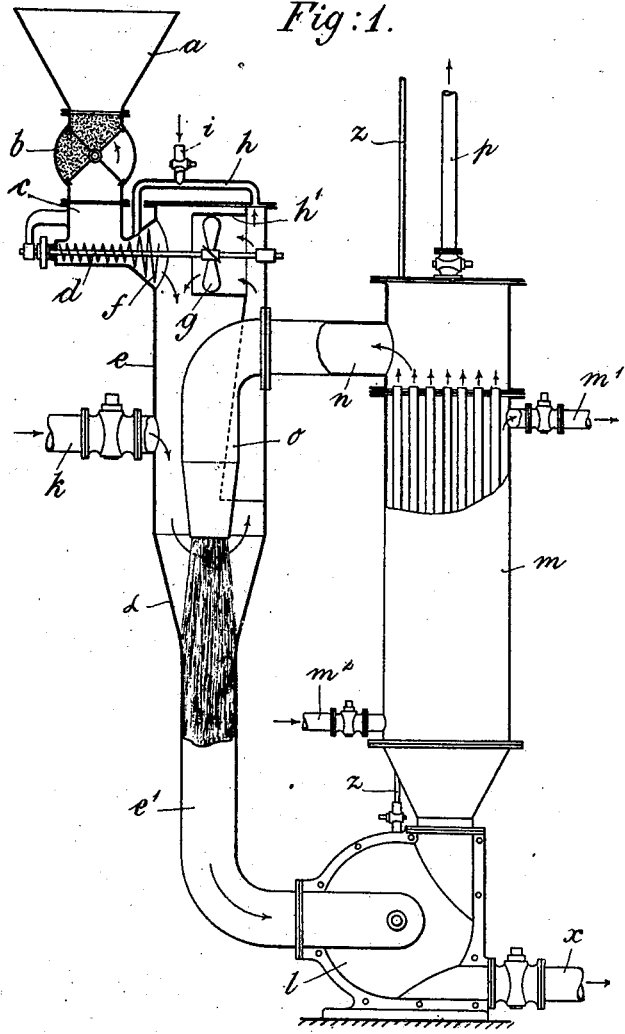
Witnesses:
Inventor:
Carl Steffen
By
his Attorneys No. 668,778.  
C. STEFFEN.  
PROCESS OF PRECIPITATING SUGAR.  
(Application filed Apr. 6, 1898.)  
(No Model.)  
Patented Feb. 26, 1901.  
4 Sheets—Sheet 2.

Witnesses:  
Inventor:  
Carl Steffen

No. 668,778. Patented Feb. 26, 1901.
C. STEFFEN.
PROCESS OF PRECIPITATING SUGAR.
(Application filed Apr. 6, 1898.)
(No Model.) 4 Sheets—Sheet 3.
Fig: 4.
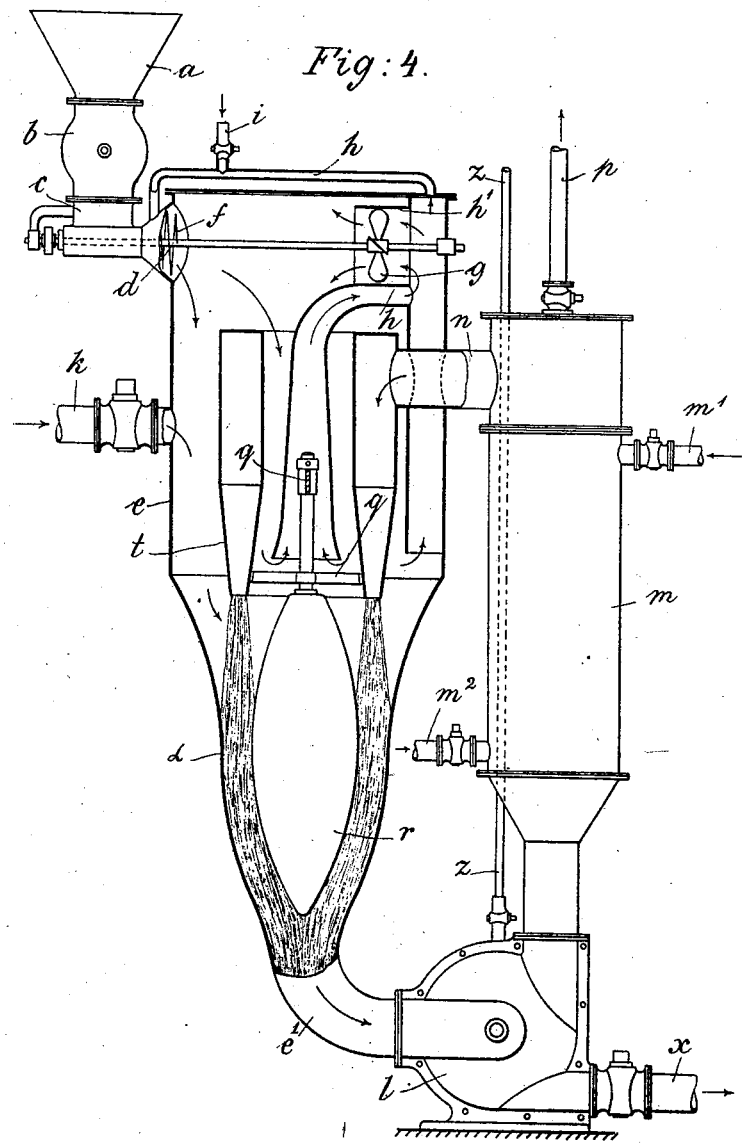
Witnesses:
Inventor:
Carl Steffen
By
his Attorneys.

No. 668,778.
C. STEFFEN.
PROCESS OF PRECIPITATING SUGAR.
(Application filed Apr. 6, 1898.)
(No Model.)
4 Sheets—Sheet 4.
Patented Feb. 26, 1901.
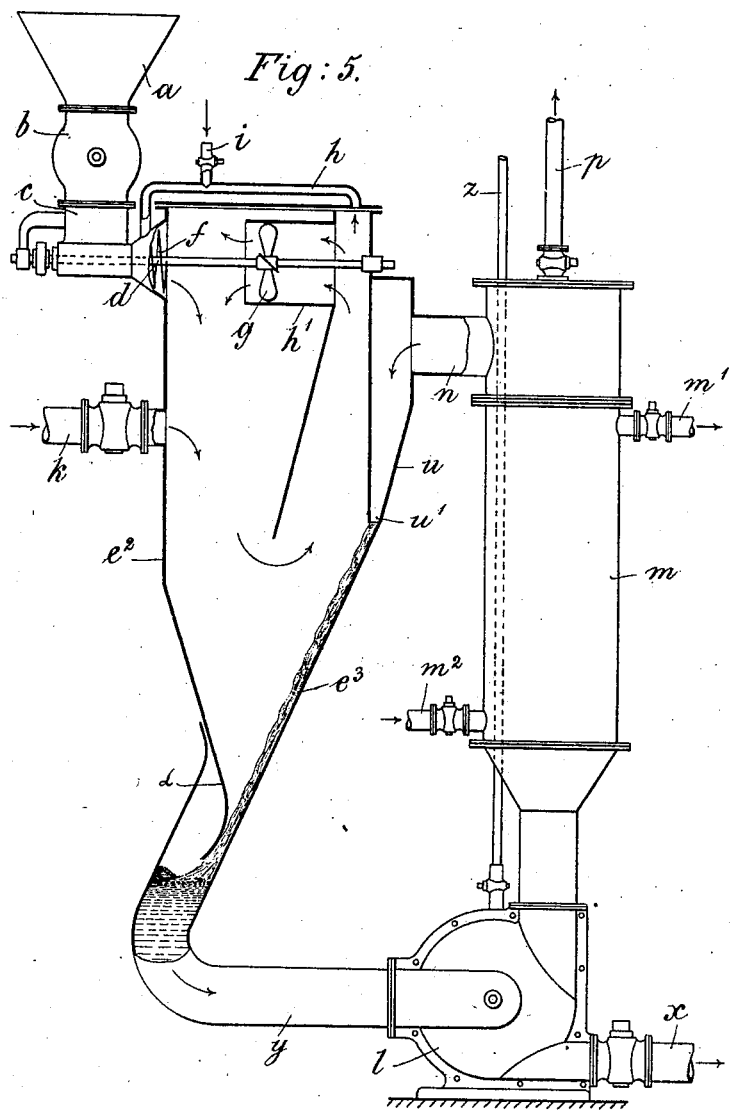
Fig: 5.
Witnesses:
Inventor:
Carl Steffen
By
his Attorneys.

UNITED STATES PATENT OFFICE.

CARL STEFFEN, OF VIENNA, AUSTRIA-HUNGARY.

PROCESS OF PRECIPITATING SUGAR.

SPECIFICATION forming part of Letters Patent No. 668,778, dated February 26, 1901.

Application filed April 6, 1898. Serial No. 676,686. (No specimens.)

*To all whom it may concern:*

Be it known that I, CARL STEFFEN, engineer, a subject of the Emperor of Austria-Hungary, and a resident of No. 40 Heugasse, Vienna, in the Empire of Austria-Hungary, have invented a certain new and useful Improved Process for Precipitating Sugar from Impure Aqueous Solutions, of which the following is a clear, full, and exact description.

This invention relates to an improved process for precipitating sugar from impure aqueous solutions as sucrate of lime by means of hydrate of lime in the form of a fine powder to be mixed with the impure sugar solution, its object being to reduce the quantity of lime necessary for the precipitation of sucrate of lime to the least possible amount, thereby reducing the expenses for carrying out the process and avoiding the danger of getting badly-washable and impure sucrates. The invention is characterized by the fact that the impure sugar solution and the lime-powder, which is mixed with air, are kept in constant circulation and brought into momentary contact within a closed chamber, so that the sugar solution takes from the mixture of lime-powder and air, in which the air serves as the carrier for the lime, on account of the momentary contact with the mixture of air and lime, only so much of the latter as is necessary to precipitate the sugar as sucrate of lime. The impure sugar solution is passed under sufficient pressure and with sufficient speed through passages or nozzles dividing the liquid into coherent sprays or layers entering and rapidly passing through the closed chamber, in which the mixture of air and lime is kept in circulation, this mixture being constantly fed with fresh quantities of lime, according to the amount of lime taken from the mixture by the circulating impure sugar solution.

In order to better explain the process, suitable apparatus adapted for carrying out the process are shown on the accompanying drawings, of which—

Figure 6:
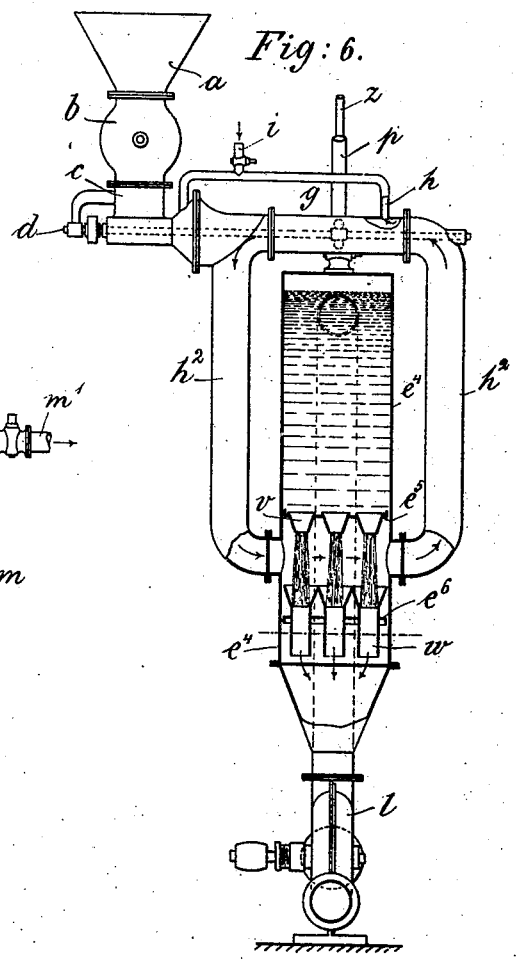

Figure 1 is a sectional elevation of an apparatus in which the liquid is fed from a mouthpiece into a nozzle, while the circulating mixture of air and lime comes in contact with the surface of the liquid spray before the latter enters the nozzle. Fig. 2 is a sectional elevation of a modification of the apparatus in which the liquid is spread out by a centrally-arranged body, so as to increase the contact-surface between the liquid and mixture of air and lime. Fig. 3 is a sectional elevation of another modification of the apparatus in which the liquid issues from an annular mouthpiece and enters a circular nozzle. Fig. 4 is a sectional elevation of a modification of the apparatus with an annular mouthpiece and circular nozzle in such arrangement that the mixture of air and lime meets the external and interior surfaces of the liquid spray. Fig. 5 is a sectional view of an apparatus in which the liquid issues from a slot or flat mouthpiece and is carried in a thin layer on a plate to a flat nozzle. Fig. 6 is a vertical section, and Fig. 7 a horizontal section, of a modified construction of the apparatus with several nozzles.

In the apparatus according to Fig. 1 the lime-powder is fed from a hopper $a$ by means of the measuring device $b$ to the casing $c$, whose worm $d$ feeds the lime into the receptacle $e$. On the worm-shafts are provided at $f$ and $g$ exhausters, which cause an active motion or circulation of the air in the receptacle $e$, hereinafter called the "reaction-chamber." This air circulates through the pipes $h$ and $h'$, as indicated by arrows, and since through the liquid sprays entering the receptacle $e$ air from this receptacle is more or less exhausted the pipe $h$ is provided with a closable or regulatable socket-piece $i$, through which the necessary quantity of air may be sucked in. In this manner the necessary quantity of lime is fed into the circulating current of air. The pipe $k$, provided with a cock or valve, communicates with the receptacle $e$, receiving the impure sugar solution, which passes through the pipe $e'$ into the the pump $l$, by which the solution is pressed into and through an intermediate receptacle $m$, provided if it is necessary to cool or heat the solution. The receptacle $m$ communicates with the receiving vessel $e$ by means of a pipe $n$, to which a bent pipe $o$, with mouthpiece entering the receptacle $e$, is connected. By starting the pump $l$ the liquid, after the cock of the pipe $k$ has been closed, is brought into constant circulation and passes the mouthpiece of the pipe *o* in a rapidly-moving spray through the reaction-chamber *e* into the nozzle of such chamber and from there into the pipe *e'*, communicating with the pump *l*. In the reaction-chamber the surface of the spray comes in contact with the circulating air carrying the lime-powder.

The ventilator *g* is provided in the circulation-pipe *h'*, having the form of a casing, and by this arrangement an active motion of the mixture of air and lime-powder, as indicated by arrows, is secured.

$m'$ $m^2$ indicate the inlet and outlet passages for the cooling or heating device *m*, and *p* is a stand-pipe provided with a cock or valve and communicating with the device *m*.

*x* indicates the closable pump-outlet for the precipitated sucrate of lime after the process is finished—*i. e.*, after all the sugar in the circulating solution has been precipitated as sucrate of lime, which is fed into filter-presses or other suitable devices for further treatment.

*z* is an air stand-pipe preferably provided with a stopcock or valve. (Not shown in the drawings.)

In the modifications of the apparatus shown in Fig. 2 and the following figures the same or corresponding parts of the apparatus described with respect to Fig. 1 are indicated by the same letters of reference, so that it is only necessary to describe the alterations of the different modifications.

According to the modification shown in Fig. 2 a pipe or casing *o'*, provided with a suitable mouthpiece, communicates with the pipe *n*. In the central axis of this pipe or casing *o'* an elliptical or other suitably-formed body *r* is fixed by suitable cross-pieces or stays *q*, such elliptical body having the object to spread out the liquid spray issuing from the casing *o'* and entering the nozzle *a*, communicating with the pipe connected with the pump, as with the first modification of the apparatus. (Shown in Fig. 1.)

In the modification of the apparatus according to Fig. 3 the upper part of the receptacle *e* forms an annular chamber inclosing an interior box or casing *s*, the lower part of such chamber forming an annular mouthpiece, from which the liquid passes into the nozzle *a*, in which the elliptical body *r* is provided. By this arrangement the liquid is passed in the form of a spray or mantle through the chamber *e*, and the interior surface of this liquid spray is brought into contact with the mixture of air and lime circulating within the casing *s*, as indicated by arrows.

In the modification of the apparatus according to Fig. 4 the pipe *n* communicates with an annular box or casing *t*, provided with an annular outlet or mouthpiece, so that an annular liquid spray is produced, which passes out through the annular nozzle formed by the elliptical body *r* and the extension of the receptacle *e*. The mixture of air and lime circulates within the casing, as indicated by the arrows, and by the arrangement shown and hereinbefore described a contact of this mixture is secured both with the exterior and interior surfaces of the liquid spray.

Fig. 5 shows another modification of the apparatus, in which the pipe *n* communicates with a box *u*, arranged within or in connection with the receptacle $e^2$, to which the sugar solution is fed, the wall at the bottom of the box *u* forming a slot or flat mouthpiece *u'* or other suitable device, allowing of the liquid passing in a thin layer along the inclined bottom $e^3$ of the receptacle $e^2$ through the reaction-chamber into the flat nozzle *u'*. By this arrangement the scumless rapidly flowing or circulating liquid is subjected to the treatment of the lime, which being intimately mixed with air constantly circulates within the receptacle or reaction-chamber $e^2$ and comes in contact with the liquid layer passing over the inclined bottom $e^3$ of this receptacle. The receptacle communicates with the pump *l* by means of a suitable casing or pipe *y*, so that a constant circulation of the liquid is secured.

Figure 7:
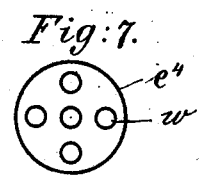

Figs. 6 and 7 represent another modification of the apparatus with several nozzles, the number of which can vary. The receiving vessel $e^4$ is divided into three compartments by horizontal partitions $e^5$ $e^6$. The partition $e^5$ carries the distributing-mouthpieces *v* and the partition $e^6$ the collecting and conducting nozzles *w* for the liquid which is led or fed to the bottom compartment of the receptacle, (reaction-chamber,) through which the liquid in separated quickly-changing streams or sprays enters, such compartment communicating with the upper part of the receptacle by pipes or other connections $h^2$, through which the mixture of air and lime may circulate by means of a ventilator *g* or other suitable device. The feeding pipe or channel for the lime also communicates with the pipe $h^2$, so that an intimate mixture of lime-powder and air is kept in constant circulation and fed to the central compartment of the receptacle, which mixture comes in contact with constantly-changing liquid surfaces.

The carrying out of the process for precipitating sugar in the form of sucrate of lime is similar in all the modifications of the apparatus hereinbefore described. The feed of the lime is uniform during the whole period of the precipitation, and no attention is paid to the fact that the quantity of the dissolved sugar in the liquid is diminished during the progress of the process on account of the precipitation. The mixture of air and lime-powder is regulated in such a manner that the mixture always contains sufficient lime at the contact-surface with the liquid spray, so that the sugar of this surface is precipitated, whereas the surplus lime is returned to circulation. A certain quantity of liquid is carried in the above-described manner so often through the reaction-chamber in which the mixture of air and lime constantly circulates that all the sugar of the liquid is precipitated as insoluble sucrate of lime.

In combination with the apparatus for precipitating sugar in the form of sucrate of lime in accordance with the process hereinbefore described pipe-coolers or other suitable apparatus are preferably arranged in connection with the pipe leading from the pump to the apparatus producing the liquid sprays when mean or low temperatures are employed in order to avoid a change of the temperature of the sugar liquid in the reaction-chamber. Instead of the cooling apparatus a device for warming or heating the liquid may for special purposes be employed.

The device or apparatus for cooling or heating the liquid can of course be entirely dispensed with, since the carrying out of the process is not rendered dependent on certain or distinct temperatures.

Having now particularly described and ascertained the nature of the said invention, I declare that what I claim, and wish to secure by Letters Patent, is—

The herein-described process of precipitating sugar from impure aqueous solutions consisting in maintaining a limited contact between a circulating current of air carrying lime in suspension and a circulating current of sugar solution, the lime being continuously fed to the air-current substantially as described.

In witness whereof I have hereunto signed my name, this 21st day of March, 1898, in the presence of two subscribing witnesses.

CARL STEFFEN.

Witnesses:
HENRY C. CARPENTER,
CHAS. E. CARPENTER.